(12) United States Patent  
Raman et al.

(10) Patent No.: US 8,730,181 B1
(45) Date of Patent: May 20, 2014

(54) TACTILE GUIDANCE SYSTEM FOR TOUCH SCREEN INTERACTION

(75) Inventors: Tiruvilwamalai Venkatram Raman, San Jose, CA (US); Charles L. Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 437 days.

(21) Appl. No.: 12/472,684

(22) Filed: May 27, 2009

(51) Int. Cl.
*G06F 3/041* (2006.01)

(52) U.S. Cl.
USPC ............. 345/173; 178/18.01; 178/19.01; 379/52

(58) Field of Classification Search
USPC ........ 345/173–178; 178/18.01–19.07; 379/52
See application file for complete search history.

(56) References Cited

U.S. PATENT DOCUMENTS

| | | | |
|---|---|---|---|
| 6,667,697 B2 | 12/2003 | Botich | |
| 7,466,307 B2 | 12/2008 | Trent, Jr. et al. | |
| 7,831,923 B2 | 11/2010 | Keohane et al. | |
| 7,853,875 B2 * | 12/2010 | Cohen | 715/273 |
| 8,004,501 B2 * | 8/2011 | Harrison | 345/174 |
| 2004/0090448 A1 * | 5/2004 | Litwiller | 345/702 |
| 2007/0132740 A1 * | 6/2007 | Meiby | 345/173 |
| 2007/0254268 A1 * | 11/2007 | Adachi et al. | 434/112 |
| 2008/0211779 A1 | 9/2008 | Pryor | |
| 2009/0002140 A1 * | 1/2009 | Higa | 340/407.1 |
| 2009/0120980 A1 * | 5/2009 | Calayo | 224/257 |
| 2010/0020021 A1 * | 1/2010 | Mills et al. | 345/173 |
| 2010/0052879 A1 * | 3/2010 | Nanos | 340/407.2 |
| 2010/0079403 A1 * | 4/2010 | Lynch et al. | 345/174 |
| 2010/0134416 A1 | 6/2010 | Karasin et al. | |

* cited by examiner

*Primary Examiner* — Michael Pervan
(74) *Attorney, Agent, or Firm* — Fish & Richardson P.C.

(57) ABSTRACT

A mobile computing device includes a housing portion defining a front face and a substantial planar back face that is opposed to and directed away from the front face. The device also includes a touch screen input mechanism arranged on the front face and a plurality of tactile guides on the back face. Program code is stored and executable on the device so that, when the code is executed, it identifies a contact input area on the touch screen, where a user can make selections on the touch screen, as being aligned with one of the plurality of tactile structures.

23 Claims, 7 Drawing Sheets

FIG. 6

TACTILE GUIDANCE SYSTEM FOR TOUCH SCREEN INTERACTION

TECHNICAL FIELD

This document relates to tactile user interfaces for portable communications and computing devices.

BACKGROUND

Mobile computing continues to grow quickly as mobile devices, such as smart phones, add more power and more features. Users of such devices may now access various services on the internet, such as mapping applications, electronic mail, text messaging, various telephone services, general web browsing, music and video viewing, and similar such services. The small size of mobile devices may make it difficult to interact with such services, because a full QWERTY keyboard may not be available on a mobile device or may not be available at all times. Thus, input to a mobile device may occur via a standard telephone dialing pad (e.g., via multi-tap inputs) or a touch screen.

In addition, interaction with a mobile device may occur in a variety of situations, in varying levels of concentration for a user. At one end of a spectrum, a user may be able to provide full attention to their device, such as when they are at their desk or riding on mass transit. At the other end of the spectrum, a user may be busy having a conversation or driving their automobile, so that any interaction with their mobile device should require a minimum level of attention from the user.

SUMMARY

This document describes systems and techniques that may be used to provide tactile input assistance to a user of a portable device such as a smart phone. Many such devices have touch screen input mechanisms on the front surfaces of their housings, and users hold the devices cradled in one or two hands, with their fingers holding the back surface of the devices, and their thumbs handling data entry on the touch screens. The input then occurs via a gripping action between the thumb above the device and the pointer finger or other finger below the device. Generally, such gripping will occur with the thumb and finger naturally in alignment with each other above and below the device, because misalignment along a line perpendicular to the face or back of the device will tend to create a twisting moment that will tilt the device in an unwanted manner.

To address such action, this document discusses the placement of tactile guidance structures on the back of a portable device or on a jacket or skin for the mobile device, where the tactile guidance structures are established to be aligned with icons or other input mechanisms that are presented on the touch screen on the front of the device. A user can then feel with his or her fingers for the appropriate tactile guidance structure, without needing to take his or her eyes off of other activities, and can make a selection eyes-free. The device may provide feedback, such as in the form of a shake or other haptic feedback, and a noise, such as by audibly announcing the selection made by the user (e.g., by saying "five" or another number when the user is using a telephone dialer or calculator application). If the announced selection is not what the user intended, the user can "erase" the selection by shaking the portable device in an appropriate manner (where the shaking can be sensed, for example, by an accelerometer in the device).

In one example, a mobile computing device is disclosed. The device comprises a housing portion defining a front face and a substantial planar back face that is opposed to and directed away from the front face, a touch screen input mechanism arranged on the front face, a plurality of tactile guides on the back face, and program code stored and executable on the device that, when executed, identifies a contact input area on the touch screen, where a user can make selections on the touch screen, as being aligned with one of the plurality of tactile structures. The plurality of tactile guides can be arranged in a repeated grid of tactile structures, and vertices on the repeated grid can align, in location, to contact input areas created by the software on the touch screen. Also, the plurality of tactile guides can comprise structures that each extend outward from the housing and that are separate from each of the other tactile guides. Moreover, the tactile guides can be adhered to the housing by an adhesive material. The guides can also comprise indentations that extend inward toward the housing, and alternatively or in addition can comprise a grid of intersecting lines.

In some aspects, the tactile guides are positioned on an outer surface of a jacket that wraps around the housing. The guides can also be in the form of alphanumeric characters or in the form of characters from a telephone dialing pad.

In another implementation, a mobile computer accessory system is disclosed that comprises a layer defining a substantially planar surface, and a plurality of tactile guides that are located on the substantially planar surface and positioned to correspond in position to selectable areas on a touch screen computing interface. The selectable areas on the touch screen computing interface are generated by program code operating on the device in the implementation. The system can also include the program code operating on the device. In addition, the layer can comprise a surface of a skin that is configured to wrap around the touch screen computing device. The system can also comprise a permanent adhesive applied to the layer, and a removable cover sheet on a side of the adhesive opposite to the layer. Also, the plurality of tactile guides can be arranged in a repeated grid of tactile guides, and wherein vertices on the repeated grid align, in location, to contact input areas created by the software on the touch screen. In some aspects, the plurality of tactile guides are each shaped to correspond to on-screen icons for an application on the computing device.

In yet another implementation, a method of using tactile guides with a portable computing device is disclosed. The method comprises positioning the portable computing device in one or more hands of a user of the portable computing device, locating with a digit of the user's hand, a tactile guide positioned on a back surface of the mobile device, and gripping the portable computing device between the digit and a thumb of the user so that the thumb contacts a touch screen on a front surface of the computing device that is opposed to the back surface of the computing device, so as to select a selectable control on the touch screen that is positioned to be in alignment with the located tactile guide. The method can also include applying the tactile guide to the portable computing device by wrapping the portable computing device in a skin that supports the tactile guide. In certain aspects, the tactile guide is part of a grid that is made up of a plurality of tactile guides, and the grid can be of a size that it has fewer than twenty-five vertices.

The described features may provide one or more advantages in certain implementations. For example, convenient tactile input mechanisms can permit a user of a mobile computing device to use the device in situations where it would otherwise be impossible. Also, even where visually-assisted use of a device may be possible, such as when a user is driving a car, tactile guidance mechanisms can substantially improve the safety of operating a portable device. In addition, such features may permit or expand the usability of a device for vision-impaired users. In these manners, the user experience with a device can improve, and can result in commercial and critical success for the device.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for providing tactile input assistance to the user of a mobile computing and communication device using tactile guides on the device. In general, tactile guides are mounted on the back side of the computing device (e.g., either directly or on a structure that is on the main body of the device) in locations that correspond to selectable objects on a touch screen input mechanism on the front side of the device. The tactile guides are aligned, front-to-back, with selectable objects, such as on-screen icons, on the touch screen so that a user can feel along the back of the device to locate an appropriate tactile guide (e.g., within a relatively small grid of individual discrete guides) and can then simply grip between their thumb and finger, because the natural alignment of the user's thumb on the front, and finger on the back, will cause the user to select the appropriate on-screen object as long as the tactile guides and selectable objects are not too close to each other. Because such an input method may result in improper selections, particularly when a user has not yet memorized a particular screen layout or where the selectable objects on the screen are many and close to each other, tactile (e.g., vibrating) and audible feedback may be provided to the user to confirm their entry, without the user having to look at the device.

Figure 1:
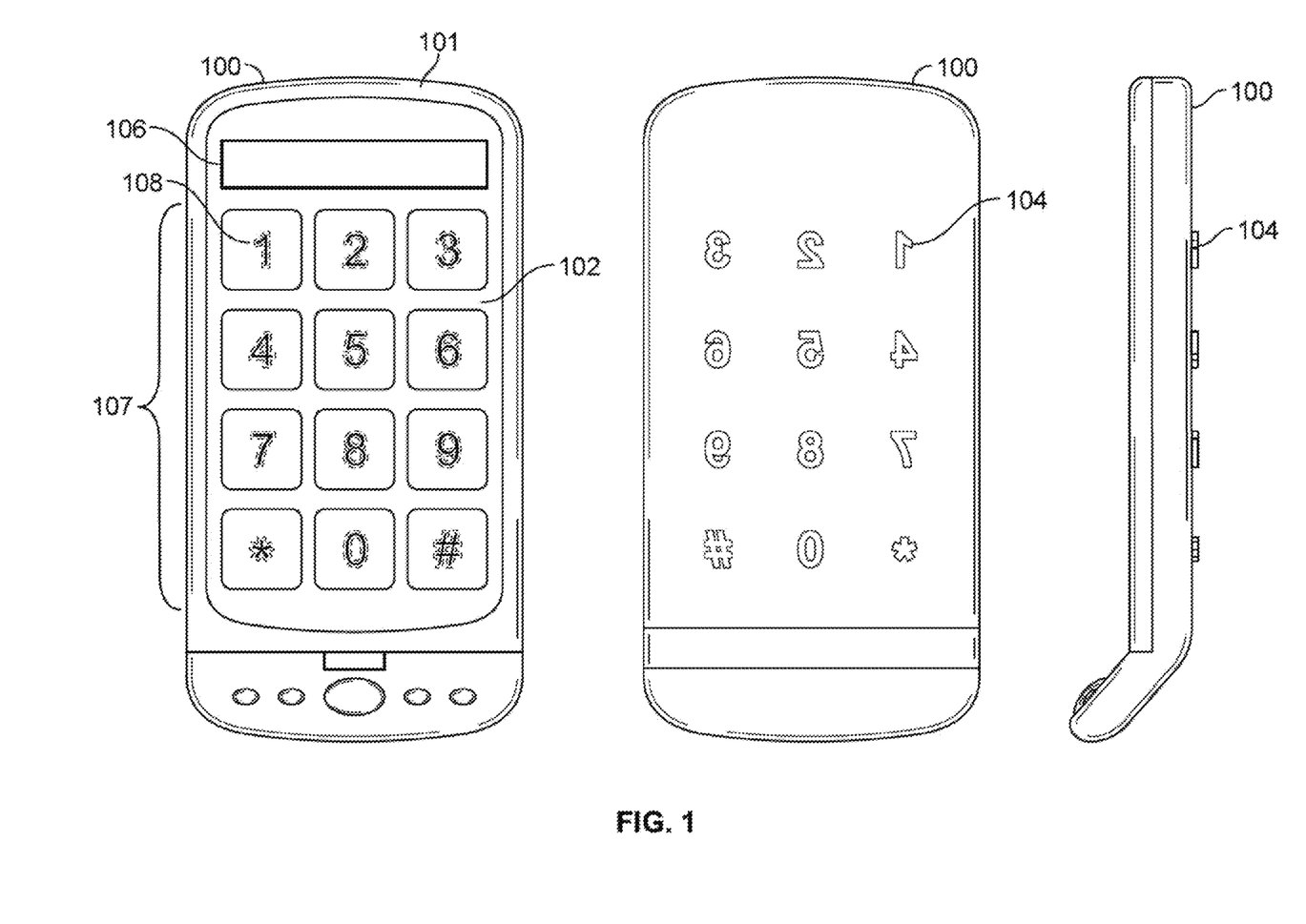
FIG. 1 shows an example touch screen portable computing device that provides tactile guidance.

FIG. 1 shows an example touch screen portable computing device 100 that provides tactile guidance for selections on a touch screen. The device 100, in this example, takes the form of a relatively flat communication device having a touch screen 102 on its front surface. Such a form factor is relatively common form for a mobile smart phone or similar communication and computing device. The touch screen 102 can take the form of a liquid crystal display (LCD) device or similar display, having a touch sensitive surface overlaid on the display. In a familiar manner, a user can press a thumb or finger onto the surface of the touch screen 102 in coordination with icons or other selectable objects that are displayed on the touch screen under the control of software operating on the device 100, so as to select one or more icons.

Device 100 is enclosed by a housing 101 that includes an opening on its front surface for the presentation of touch screen 102. The housing may take a variety of forms, including a generally flat housing as shown, a closable clamshell design, a housing with a sliding display that may be moved out of the way to expose a mechanical keyboard, and other similar types of housings.

In this example, a telephone dialing application is being displayed on touch screen display 102. The dialing application displays a plurality of dialing keys 107 in a familiar configuration, as a 3×4 grid of alphanumeric characters that a user may press in order to dial a telephone number of a party who they wish to call. A data entry area 106 is also displayed, where numbers are added to the graphical display linearly while a user selects them using the keys 107.

Corresponding tactile guides in the shape of numbers are provided on the back surface of the device 100, such as the corresponding number "1", which is designated 104. These corresponding numbers are located so as to be aligned in a front-to-back fashion with the numbers on the keys 107 of the dialing application. Dashed lines are shown in the front view of the device 100, and indicate the general alignment of physical numbers on the back of the device 100, with the electronically displayed virtual numbers on the front of the device 100. The alignment in this example—as shown by a slight mismatch between the numbers on the touch screen shown in solid lines and the forward extension of the numbers on the back side of the device shown in dashed lines—is not perfect, and need only be sufficient so that a user can be expected to press the correct button on the touch screen 102 after finding a corresponding item on the back of the device 100.

In this example, the numbers 104 take the form of rubberized adhesive characters that can be adhered to the back of the housing 101. The numbers 104, when viewed from the back of the housing 101, serve to correspond with the numbers viewed from the front of the housing on the touch screen. The numbers 104 are also arranged in a 3×4 grid. In this manner, a user can visualize the grid in their mind's eye while sliding across the back of the device 100 with their fingers. They may understand that the number "1" should appear in the upper left corner of the grid, and may slide their fingers quickly across the various numbers on the back of the device 100 to get to the upper left corner of the grid. In addition, upon finding the number "1" in the upper left corner, the user may move their finger along the tactile guide that makes up the number so as to confirm that it is approximately the right shape for that number, to ensure that they have found the appropriate location in the grid. The user may then, by gripping, close their thumb on the touch screen 102 while maintaining their fingertip on the back of the device 100 on top of the relevant tactile guide. In this manner, the user's thumb will naturally contact the number "1" that is displayed on touch screen 102. All of this activity can happen very quickly for a user that has only limited training, and who is using an arrangement of numbers, such as the dialing grid here, that is inherently familiar to them.

The numbers on the back of housing 101 in this example take the form of tactile guides, in that they extend from the back of the housing 101 in a manner in which so that a user can conveniently identify, locate, and feel them. The side view shows more directly how each of the alphanumeric characters extends slightly (i.e., a small fraction of an inch) from the back wall of the housing 101. The tactile guides may take a variety of other forms, as discussed in further detail below, including the form of dots arranged in a grid, lines arranged in a grid or checkerboard pattern, and indentations arranged in similar manners.

In this example, the tactile guides are shown as being adhered directly to the back of a shell or housing for the device 100, but they may also be appropriately located on the back of the device 100 in other manners. For example, skins or jackets are relatively common mechanisms for protecting mobile devices from scratches and other damage. These skins or jackets typically sit very snugly around a device, and thus can be expected to locate items that are placed on the skins or jackets in a predictable location relative to the device. The skins or jackets may also be made out of elastic materials, and may thus stretch around a device 100 and snap back tight to the device 100, so that they become, effectively, part of the device itself. As a result, the tactile guides can be adhered to the skin or jacket, or may be formed as part of the skin or jacket. For example, a skin or jacket may be formed from an elastomeric or other similar material, and the mold that forms the skin or jacket may be formed to include bumps (or indentations in the mold) that may be used as tactile guides. Alternatively, indentations may be left in a jacket (using bumps in a mold) so that a user may feel across the tactile guides much like a marble rolls across the surface of a Chinese checkers board—sticking at each indentation and then rolling quickly to the next indentation.

In FIG. 1, electronic components may be used in cooperation with the tactile guides described here. In particular, a storage device, which may take a variety of forms, including Flash memory, other forms of solid state memory, or a hard disk drive, can store instructions for generating selectable objects on the touch screen 102 that are positioned so as to align with corresponding individual tactile guides on the back of the device 100. A processor may be connected to the storage device so as to execute the instructions and cause the touch screen 102 to display the selectable objects and to react appropriately to user selections on the touch screen 102 of the objects. In addition, a feedback structure, which may take the form of a speaker or vibrator (for haptic feedback) and associated controls, may receive commands from the processor in order to indicate to a user of device 100 that their input has been received and also potentially to provide feedback that identifies what the device 100 interpreted the input as representing (e.g., the number "1" in the example above). Particular functionality for these components is described in more detail above and below, and a broader electronic structure of device 100 in which these components may reside is described with respect to FIG. 6 below.

Figure 2A:
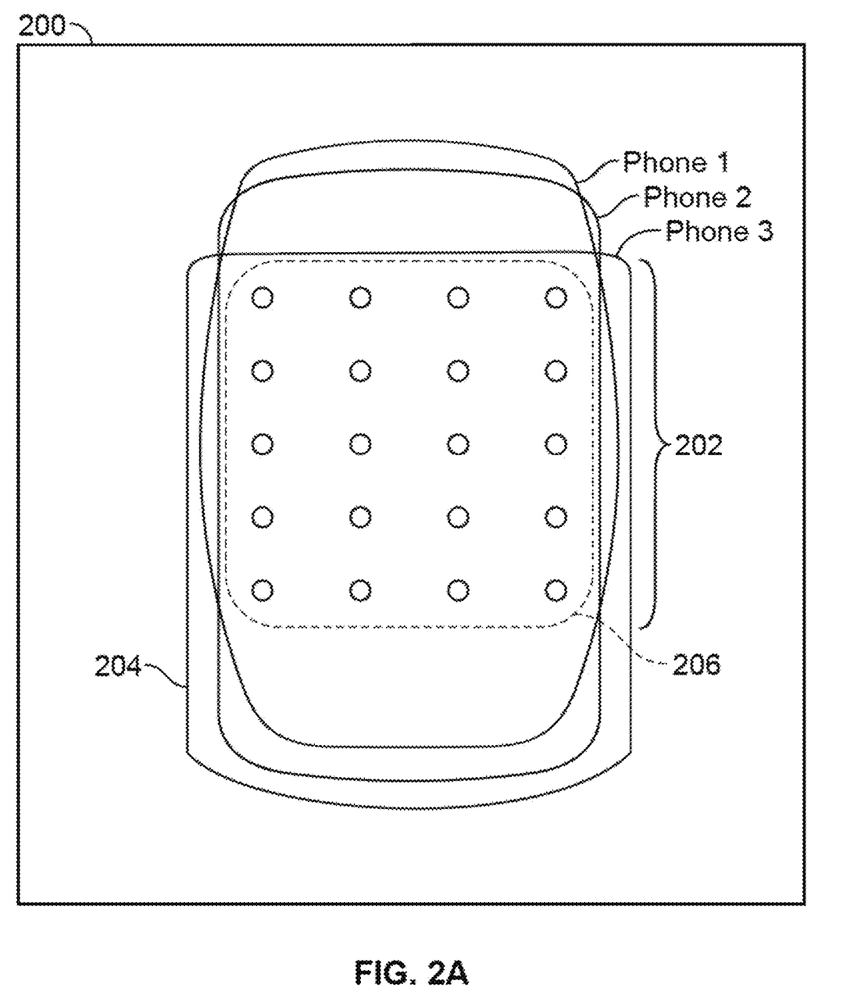
FIG. 2A shows a system that can be used to add tactile guidance to a portable computing device.

FIG. 2A shows a system that can be used to add tactile guidance to a portable computing device. The system is in the form of structural components that could be purchased by a user of a device after the user has received the device, and can be applied by the user to their device, as an after-market accessory.

In this example, the system includes a support sheet 200 that provides support for the other components. A grid 202 of tactile guides is arrayed on the support sheet 200. While the grid in FIG. 1 was somewhat custom to a numeric keypad, the grid 202 here is generic, in that it can be employed equally by a variety of different applications because the layout of the grid and the shapes of the individual tactile guides are not directed to any particular software application, but instead can be made available for use by any application programmer.

The grid may be lightly adhered to the support sheet 200, such as in situations where the support sheet 200 comprises a sheet of paper or paperboard. Alternatively, the grid 200 can be part of the support sheet, such as when the guides and the sheet 202 are both made out of an elastomeric material. Where the tactile guides are separate from the sheet 202, they may have a stronger, permanent adhesive on the top side, opposite from the side where they contact the sheet 202, so that they can be pressed against a wall of a portable computing device and the sheet 202 may subsequently be pulled away, leaving the guides adhered to the device. Where the tactile guides are part of the sheet 200 itself, a perforation 206 may be provided around a periphery of the grid 202. The grid 202 and guides may then be placed onto a device as a joined unit, and the sheet 200 can be pulled back away from the device, while the sheet 202 separates at the perforation 206 to leave the grid 202 in place on the device. The outer portion of the sheet 202 (i.e., outside the perforation) may then be discarded and the inner portion may remain in place on the portable computing device.

A number of outlines, such as outline 204, have been printed or otherwise provided on the sheet 202 for this example. These outlines may provide positional guidance to a user of the system for when they are applying the tactile guides to their portable computing device. In particular, instructions that come with the system may tell the user to place the sheet 200 on a flat horizontal surface and to remove a liner that had previously covered the guides to prevent them from sticking to anything inadvertently. The user may then be instructed to position their head over the top of the sheet 200 and to lower their portable computing device onto the grid 202 and to press down on the device to adhere the guides to the device. As the user moves the device downward, they may be instructed to maintain the outline of the device within one of the outlines that are drawn on the sheet 200. In this example, there are three telephone outlines, which are meant to represent the three most popular smart phones that are available on the market, or a certain family of phones from a particular manufacturer. Each outline is labeled—here with a generic label like "Phone 1", but in actual implementation with the make and model number of the phone that matches the particular outline. The use of the outlines, and the user's alignment of the computing device with the proper outline while applying the device to the tactile guides, can result in the tactile guides being aligned properly on the back of the device. For example, the outlines can help ensure that the guides are placed in a position on the back of the device, that matches, front-to-back, a position on the screen on the front of the device—and, as importantly, that each of the guides is actually placed behind the screen rather than around the edge of the screen or on the device bezel.

The system shown here may be sold in combination with software that can be loaded by a user onto their portable computing device. The software may be provided on a physical media (e.g., CD ROM or Flash drive) that is sold with the system, or that can be downloaded over a network such as the internet. The software may provide functionality to align the grid 202 with objects shown on a touch screen of the device, and may alternatively or in addition serve as an interface that operates in coordination with the system.

With respect to alignment, the software may ask the user to close their eyes and make certain selections on the device in alignment (as their fingers perceive it) with various of the tactile guides on the back of the device (e.g., in the four corners of the grid 202). Such an alignment process may be similar existing processes that are used for aligning pen input on touch screen devices, and may be used by the software to shift recognized locations on the screen of the device so that selections that are not directly over a displayed icon or other selectable object will result in selections. In other words, the recognized area for selecting an object may be shifted slightly away from the location where the object is displayed on the device. In this manner, if a user did not apply the grid 202 properly or if the user does not perfectly align his or her finger and thumb when making selections on the device, the alignment process can correct for such errors.

In addition, the software may provide alternative user interfaces for common applications, where the native interfaces do not have selectable on-screen objects that would otherwise be aligned with the grid. Examples of such programs include telephone dialers, media players (e.g., for video or audio files), navigation and mapping programs and the like. Thus, for example, the display of the native application may be replaced by a display that is written to have its icons align front-to-back with the tactile guides in the grid 202. The application that provides the substitute display may then translate any user inputs and provide them to the native application.

The software may also be part of an operating system on the device itself, where a developer of the operating system provides an API and guidelines for application developers. For example, the operating system may provide libraries by which developers can conveniently locate icons of an appropriate size in particular preset locations on a screen and may conveniently define interaction for those icons—effectively "snapping" the icons to locations that are known to align with tactile guides on the device. The operating system may also coordinate feedback mechanisms for users who select icons at those locations.

Where the software is downloadable, a product in the form of an adhesive layer and other related layers may be purchased by a user, such as in a physical paperboard package at an office supply store. After a user applies the adhesive layer to their portable computing device, they may use their portable computing device to take a picture of the bar code on the package in which the materials were sold. An application that is preloaded on the device may be programmed to submit the image of the barcode to a remote server system that is programmed to correlate bar codes that have been registered with the server system to a URL or other on-line object. Such a system may then cause the user's device to be redirected to the URL so that automatic downloading of the appropriate software may occur. In this manner, a simple link between a physical product that will already be associated with a bar code, and on line software that goes along with the product, can be made for a user.

Figure 2B:
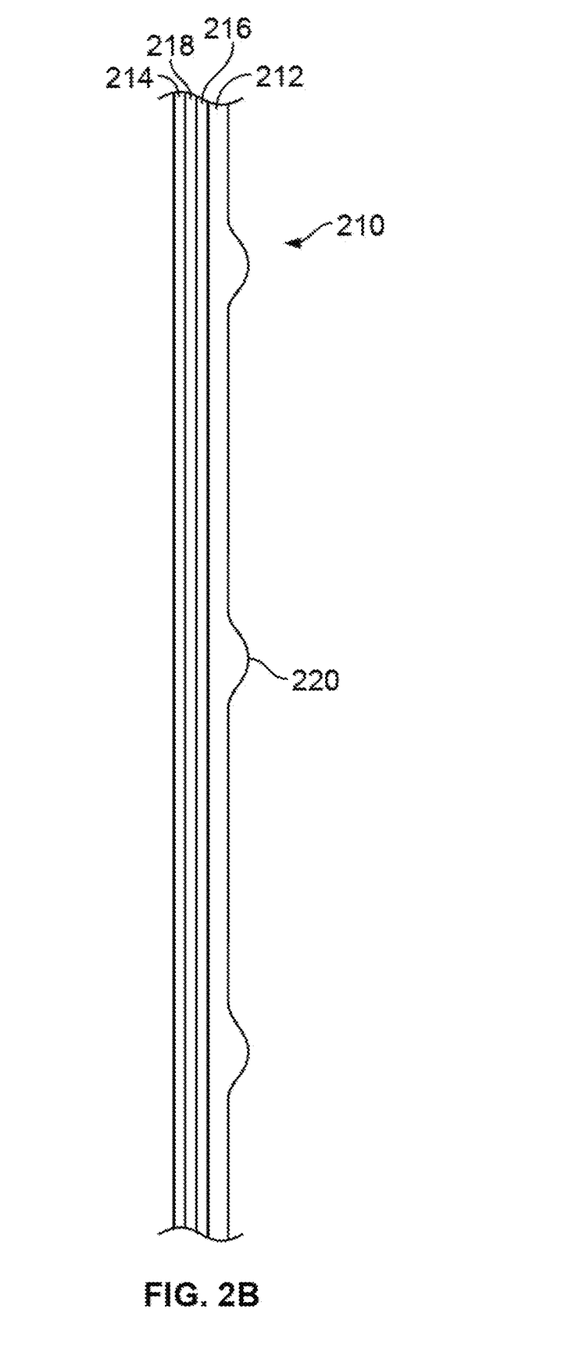
FIG. 2B shows a side view of a system like that in FIG. 2A.

FIG. 2B shows a side view of a system 210 like that in FIG. 2A. In general, the system 210 provides an elastomeric sheet 212 that supports a plurality of tactile guides such as guide 220. In this example, the guides will be joined by the sheet even after they have been applied to a device, though they may alternatively be separated from each other, and initially connected only by a sheet that is removed after the guides have been placed in position on a device.

The tactile guides in this example are in the form of smoothly rounded bumps that are high enough and sharp enough to be felt by the finger of a user of a portable computing device, but low and smooth enough that they do not unnecessarily catch on objects that may brush by the device. Also, because the material is elastomeric in this example, the guides can "give" a small amount when they are contacted by a user's finger—so that the finger, when it is moved across the back of the device, will stick on a guide for a bit and then jump to the next guide. A permanent adhesive layer 216 is applied to the back face of the elastomeric sheet 212, and in turn contacts a release layer 218 (which is microscopically thin) that is applied on a removable paper liner. The release layer 218 is provided to prevented the permanent adhesive layer 216 from sticking unnecessarily to the liner. Thus, in operation, a user of the system would remove the paper liner 214 and release layer 218 from the face of the permanent adhesive 216, place the sheet 212 on their device or their device on the sheet 212, and potentially remove a back sheet (not shown) from the back of the guides (e.g., if the guides were separate from each other). Particular chemicals and other materials that can be used for the various components are well known.

Figure 3:
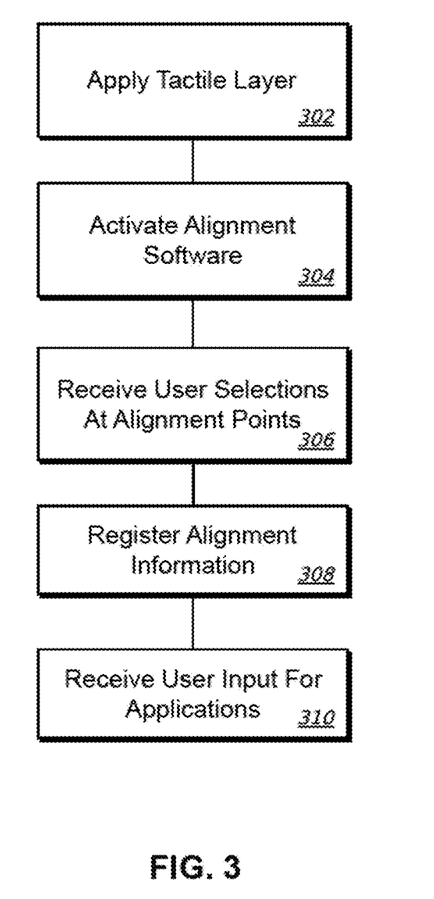
FIG. 3 is a flowchart of a process for aligning a tactile input guidance system.

FIG. 3 is a flowchart of a process for aligning a tactile input guidance system. In general, the process involves applying tactile guides to a device and then testing software on the device to align recognition areas on a touch screen with the locations of the tactile guides.

The process begins at box 302, where a tactile layer is applied to the device. The tactile layer may comprise a sheet that has a number of bumps or indentations on it, and the bumps or indentations may be arranged in a variety of manners, including in a grid. The bumps or indentations may be joined by a sheet, such as a sheet that is adhere to the housing of a device or a portion of a skin or jacket that is wrapped around a device. Alternatively, the bumps or indentations may be parts of separate and discrete structures that each adhere to the device separately from each other, and which may be joined to a removable application sheet when they are applied to the device.

At box 304, a user activates alignment software on the device. The software 304 may be pre-loaded on the device, such as in an operating system, may be loaded from a physical media that was received with the tactile layer of material, or may be downloaded and run. The software may be unnecessary where proper alignment can be assumed, such as where the tactile guides are provided on a device initially (e.g., that are formed into a plastic or metal case or housing of the device) or where the separation between tactile guides is sufficiently large that fine alignment is not needed.

At box 306, user selections are received at alignment points on a touch screen of the user's device. For example, the software may ask the user to locate the tactile guides in the four corners of a grid of guides and to press sequentially on the device at the locations of those four points. The software may then register those points (box 308) as corresponding to the corners of the tactile guide grid. In this manner, the device can correct for misapplication of the grid, or user-specific idiosyncrasies regarding the interaction with the grid. Finally, at box 310, the device receives user inputs for applications on the device. The user inputs may be adjusted appropriately by the output of the alignment process. The adjustments may be limited however, because they will tend to push the areas on the touch screen that are programmed to recognize inputs for a particular icon or other selectable control, away form the visual representation of that icon or selectable control on the screen. Thus, overcorrection aimed at improving eyes-free operation may hurt the ability of the device to respond to user input when the user is actually looking at the screen.

Figure 4:
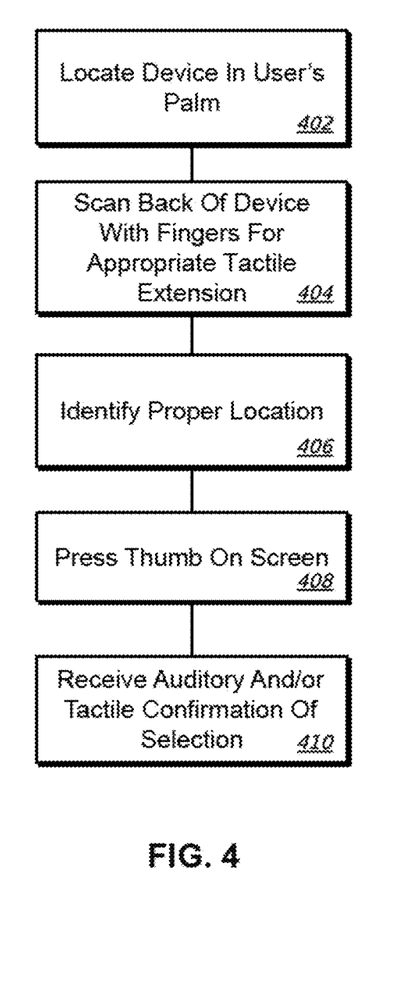
FIG. 4 is a flowchart of a process for using a tactile input guidance system.

FIG. 4 is a flowchart of a process for using a tactile input guidance system. In general, this process lays out the steps that a user may take in using a tactile input guidance system that is mounted to the back of a portable computing device, in reacting to icons or other selectable controls that are displayed on the front of the device (though the controls would be provided without actually showing them on the display, since the user is presumed not to be looking at the device in any event).

The process begins at box 402, where the user locates the device in his or her palm. Such action may occur with a single hand, where the user cradles the device, or may occur by the user holding the device with one hand and entering data with another. At box 404, the user scans the back of the device with his or her fingers looking for an appropriate tactile extension (or indentation). For example, the user may run their finger across bumps in a grid looking for the upper right bump if they are in the process of dialing in a telephony application and want to dial the number "3". When the user finds the proper tactile guide (box 406), such as by recognizing that they have moved off the upper right corner of the grid, and then by moving quickly back to the last tactile guide, the user can squeeze their finger upward and their thumb downward onto the touch screen on the front of the device so as to select whatever selectable control I positioned under their thumb. If the user is handling the device in an expected manner, their thumb should align with their finger (e.g., pointer finger) behind the device, and they should press the number "3" on their dialer, where software on their device has positioned that number so as to be in a location on the screen that is known to align with the location of the upper right tactile guide on the back of the device.

At box 410, the user receives auditory or tactile confirmation of their selection. Tactile confirmation may typically occur via a vibrator in the device being activated for a short period in a familiar confirmatory manner. Such immediate feedback can signal the user that their selection has been registered and that they can lift their thumb and move to a next dialing key. Auditory feedback can serve a similar role, such as when the feedback is a beep from the device, or may serve an additional role of explaining what the device interpreted the input as being, such as by using a voice module to state the number "3" out loud through a speaker that is in or connected to the device. If the input that is stated by the device is what the user intended, the user may move on and repeat the actions of boxes 404-408 for a next input (e.g., a next character), whereas if the input is not what they intended, they may indicate an intent to erase the input. Such an intent may be indicated in a variety of ways, such as by a swiping motion on the screen, a shaking of the device, or an audible input (e.g., "scratch that").

FIGS. 5A-5D show various examples of layouts for tactile input systems. The particular layouts are shown here to provide examples, and are not meant to be exclusive. Other layouts may also be provided, such as layouts that are, or that integrate, a picture in the form of a line drawing, such as a portrait, a landscape, a still life, or other picture. Components within the picture may be located and shaped in such an example to correspond to particular input keys on a screen. For example, a landscape could be formed to interoperate with media player software, and pressing on the screen at a location that corresponds to a sun tactile guide may stop the media from playing, while pressing on a mountain may cause the media to play.

Figure 5A:
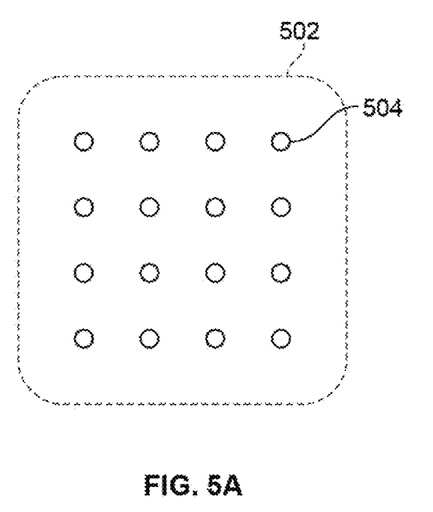
FIGS. 5A-5D show various examples of layouts for tactile input systems.

Referring to FIG. 5A, a grid of round dots is shown. The grid in this example is a 4×4 grid. Although the 4×4 grid is the most apparent grid here, other forms of grids are also shown or suggested within the 4×4 grid. For example, a subset of the 4×4 grid may be identified in 2×2 grids, such as a central 2×2 grid on the device that lies inside the 4 dot perimeter of the grid. Also, a 3×3 grid is suggested by the spaces between the dots. A 4×3 grid is likewise suggested by the spaces that appear vertically between the dots but in vertical alignment with the columns in the main 4×4 grid. In a like manner, a 3×4 grid is suggested by the spaces between the columns but in alignment with the rows of the 4×4 grid. Thus, great flexibility may be represented by a rather simple grid, where the size of each grid is relatively prime to the other grids that are in use. In this manner, a simple grid can be made available to a variety of applications that can use different positions on the grid—and not just the 16 explicit positions on the grid—for various functions.

Additional functionality may be obtained by programming software applications to accept different sorts of inputs. For example, long press inputs may be interpreted differently than are taps on a screen. Likewise, relative pressure of a selection may be used to interpret different inputs at the same location in different manners. Also, swiping inputs across multiple grid points can represent still additional intents of a user of a device.

A dashed line 502 is shown around the grid 504 to indicate that the points in the grid 504 can be connected to each other by a sheet in some implementations. Alternatively, the points can be separate and distinct from each other.

Figure 5B:
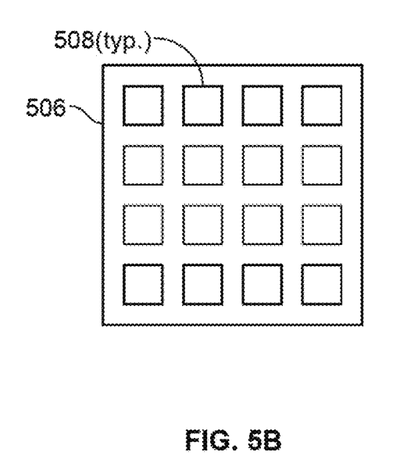

FIG. 5B shows another 4×4 grid 506. This grid 506 differs from the grid in FIG. 5A because it comprises squares rather than dots and it is made up of the lines that define those squares rather than the squares themselves. In particular, the extending portions of the grid 506 are similar to window mullions, and the intervening squares between the lines are punched out in this example. Thus, the open squares could be considered to be the vertices of the grid, or the intersection points of the lines could be considered to be the vertices (i.e., for a 5×5 grid in this example). In this manner, flexibility in terms of multiple different grid sizes can be provided in a manner like that discussed above. Also, alternatively, the "windows", such as window 508, of the grid 506 may be punched out and adhered to the portable computing device, and the mullions may be pulled away and discarded (or the windows can be mounted on one user device and the mullions on another).

Figure 5C:
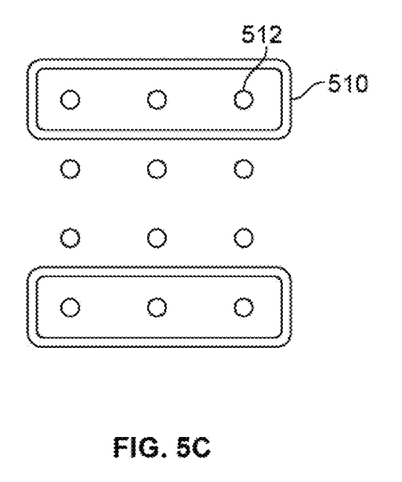

FIG. 5C shows a slight variation on the grid of FIG. 5A. Here, a 3×4 grid of dots 512 is shown, but the top and bottom rows of dots are surrounded by perimeters 510. The perimeters may be used in various manners. For example, they can simply be used as additional tactile guides for a user's fingers, so that user can more immediately know that they are at the top and/or bottom row. In addition, they may correspond to selectable objects that are displayed on the touch screen of a device. For example, one object such as an "OK" key for a dialog box, may span the entire width at the bottom of a screen, and may thus correspond in size and shape to the perimeter at the bottom of the grid. A user may thus understand that any selection that make that is aligned with the perimeter will result in a selection of that object.

Figure 5D:
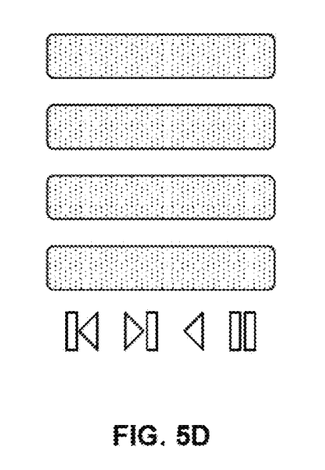

FIG. 5D shows yet another example of a layout of tactile guides. In this example, the tactile guides take two exemplary forms. First, a series of strips 514 represent generic areas for alignment and selection by a user. The strips in this example are thin abrasive layers having adhesive on one side, like adhesive pieces of light sandpaper. Second, a set of icons 516 are provided and correspond to common media player controls. These icons 516 may be positioned to align with corresponding media players controls on the front of the device (e.g., at the bottom of a screen so that album cover art can be shown in the main area of the screen or displays for other applications such as telephony applications can be displayed while the media player controls are still accessible at the bottom of the screen). A user, in addition to memorizing the relative locations of each icon, may use the feel of the shape of the icons to identify the icons that the user would like to select.

As indicated, the tactile guides provided with a device can be either generic, specialized, or a combination of the two. Specialized guides may be appropriate for applications that a user will employ frequently on their device, such as dialers and media players. Generic guides—i.e., guides that are not directed to any particular application or type of application, whether by their layout or the shape of each tactile guide—can be more appropriate for mass market application, where specific favorite applications for a user are not known, and greater flexibility of application is required.

These are just a few examples of layouts for tactile guides on portable computing devices. Other layouts may be limited as a practical matter by an upper limit on the number of selection locations that may be used while maintaining accuracy, and also by the limited memory of the user of a device. However, the examples here should highlight the flexibility that can be provided even where the number of locations is limited.

Figure 6:
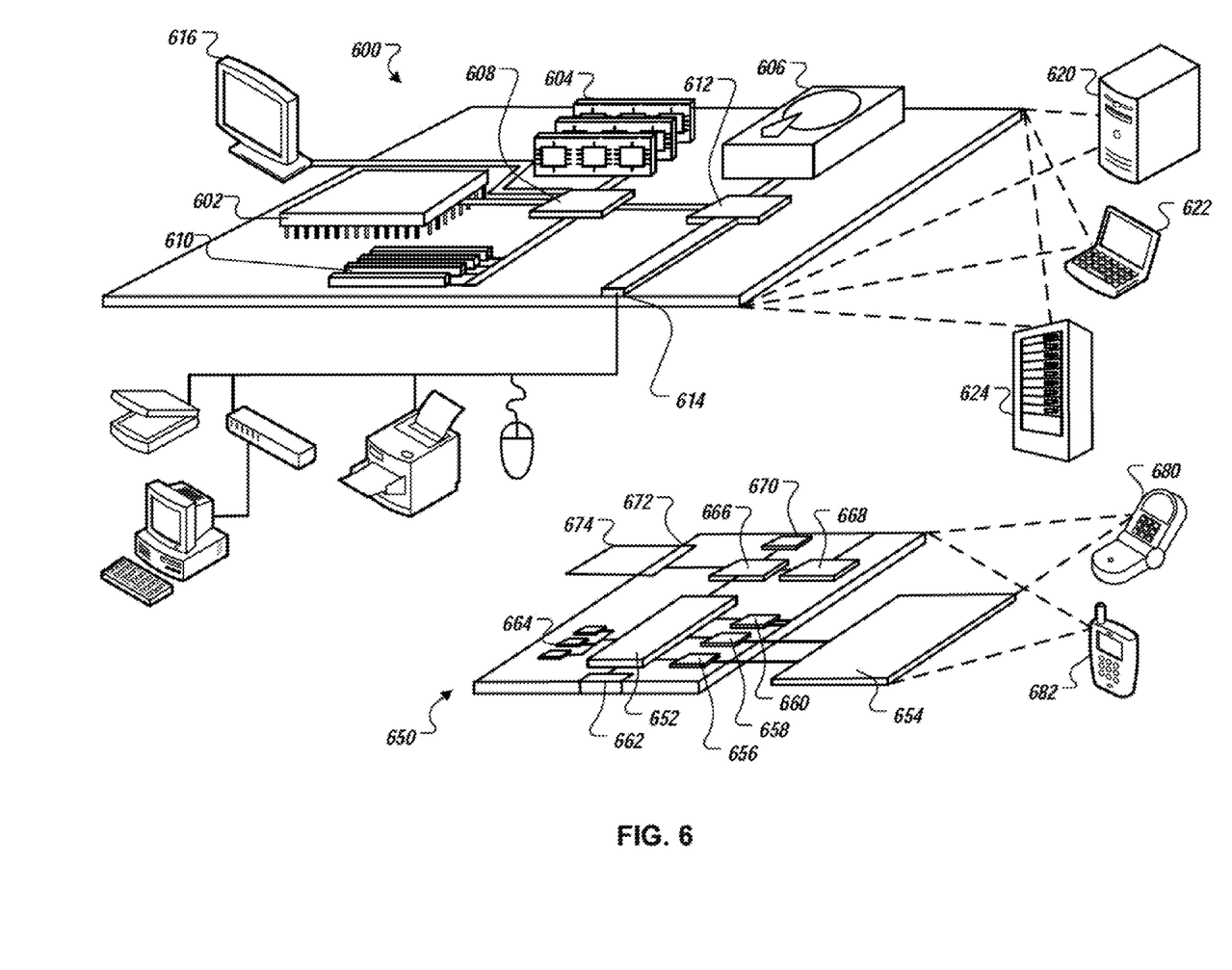
FIG. 6 shows an example of a generic computing device and a generic mobile computing device.

FIG. 6 shows an example of a generic computing device 600 and a generic mobile computing device 650, which may be used with the techniques described here. For example, the computing devices may support tactile input mechanisms and may also execute software for working in spatial coordination with those tactile input mechanisms. Computing device 600 is intended to represent various forms of digital computers, such as laptops, desktops, workstations, personal digital assistants, servers, blade servers, mainframes, and other appropriate computers. Such computers may have touch input mechanisms provided with them that could benefit from the tactile input techniques described above. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to certain tactile input layouts, but other various layouts may also be used.

In addition, the logic flows depicted in the figures do not necessarily require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A mobile device, comprising:
a housing defining a front exterior surface of the mobile device and a substantial planar back exterior surface of the mobile device that is opposed to and directed away from the front exterior surface of the mobile device;

a touch screen input mechanism arranged on the front exterior surface of the mobile device;

a plurality of fixed tactile guides that are arranged in a repeated grid on, and that extend inward to or outward from, the back exterior surface of the mobile device; and program code stored and executable on the device that, when executed, identifies one or more contact input areas on the touch screen, where a user can make selections on the touch screen, as being substantially aligned with one or more corresponding tactile guides from the plurality of fixed tactile guides, wherein each tactile guide from the plurality of fixed tactile guides is smaller than a contact input area to which it corresponds.

2. The device of claim 1, wherein the plurality of fixed tactile guides are dot shaped.

3. The device of claim 2, wherein the plurality of fixed tactile guides comprise solid structures that each extend outward from the back exterior surface of the mobile device and that are separate from each of the other fixed tactile guides.

4. The device of claim 2, wherein the plurality of fixed tactile guides are adhered to the back exterior surface of the mobile device by an adhesive material.

5. The device of claim 1, wherein at least one of the plurality of fixed tactile guides is shaped to correspond to on-screen icons displayed on the touch screen computing interface for an application running on the mobile device.

6. The device of claim 1, wherein the plurality of fixed tactile guides are positioned on an outer surface of a jacket that wraps around the substantial planar back exterior surface of the mobile device.

7. The device of claim 1, wherein the plurality of fixed tactile guides are in a form of alphanumeric characters.

8. The device of claim 1, wherein the plurality of fixed tactile guides are in a form of characters from a telephone dialing pad.

9. The device of claim 1, further comprising program code stored and executable on the device that, when executed, generates an alternate user interface for an application in which contact input areas are not aligned with the fixed tactile guides, the alternate interface including contact input areas on the touch screen that are aligned with the fixed tactile guides.

10. The device of claim 1, further comprising program code stored and executable on the device that, when executed, aligns the contact input areas with the fixed tactile guides in response to a predefined set of user selections.

11. An apparatus, comprising:
a layer defining a substantially planar back exterior surface of a mobile device; and
a plurality of fixed tactile guides that are arranged in a repeated grid and that are located on the substantially planar back exterior surface of the mobile device and positioned to correspond in position to a plurality of selectable areas on a touch screen computing interface at a front exterior surface of the mobile device,
wherein each of the plurality of fixed tactile structures is smaller than a respective selectable area from the plurality of selectable areas to which that fixed tactile structure corresponds, and
wherein the plurality of selectable areas are defined by program code executed by a processor on the mobile device.

12. The system of claim 11, further comprising the program code executed by a processor on the mobile device.

13. The system of claim 11, wherein the layer comprises a surface of a skin that is configured to wrap around the touch screen computing interface of the mobile device.

14. The system of claim 11, further comprising a permanent adhesive applied to the layer defining a substantially planar back exterior surface of a mobile device, and a removable cover sheet on a side of the adhesive opposite to the layer defining a substantially planar back exterior surface of a mobile device.

15. The system of claim 11, wherein the plurality of fixed tactile guides are dot shaped and comprise solid structures that each extend outward from the back exterior surface of the mobile device and that are separate from each of the other fixed tactile guides.

16. The system of claim 11, wherein at least one of the plurality of fixed tactile guides is shaped to correspond to on-screen icons displayed on the touch screen computing interface for an application running on the mobile device.

17. The system of claim 11, further comprising program operating on the mobile device that generates an alternate user interface for an application in which contact input areas are not aligned with the fixed tactile guides, the alternate interface including contact input areas on the touch screen that are aligned with the fixed tactile guides.

18. The system of claim 11, further comprising program operating on the mobile device that aligns the contact input areas with the fixed tactile guides in response to a predefined set of user selections.

19. A method of using tactile guides with a portable computing device, comprising:
positioning the portable computing device in one or more hands of a user of the portable computing device;
locating with a digit of the user's hand, one fixed tactile guide of multiple fixed tactile guides positioned in a repeated grid on a back exterior surface of the portable computing device; and
gripping the portable computing device between the digit and a thumb of the user so that the thumb of the user contacts a particular one of multiple regions of a touch screen on a front exterior surface of the portable computing device that is opposed to the back exterior surface of the portable computing device and that is larger than the one fixed tactile guide, so as to select the particular one of multiple selectable controls on the touch screen that is positioned to be in alignment with the located one fixed tactile guide of the multiple fixed tactile guides on the back exterior surface of the portable computing device.

20. The method of claim 19, further comprising applying the grid of multiple tactile guides to the portable computing device by wrapping the back exterior surface of the portable computing device in a skin that supports the multiple tactile guides.

21. The method of claim 19, wherein the located fixed tactile guide is dot shaped and comprises a solid structure that extends outward from the back exterior surface of the mobile device and that is separate from each of the other fixed tactile guides.

22. The method of claim 19, wherein the grid has fewer than twenty-five vertices.

23. The method of claim 19, further comprising, before positioning the portable computing device in one or more hands of a user of the portable computing device, aligning each of the multiple selectable controls on the touch screen with each of the multiple fixed tactile guides positioned on the back exterior surface of the portable computing device.

* * * * *

UNITED STATES PATENT AND TRADEMARK OFFICE
CERTIFICATE OF CORRECTION

PATENT NO. : 8,730,181 B1  
APPLICATION NO. : 12/472684  
DATED : May 20, 2014  
INVENTOR(S) : Tiruvilwamalai Venkatram Raman and Charles L. Chen

Page 1 of 1

It is certified that error appears in the above-identified patent and that said Letters Patent is hereby corrected as shown below:

In the Claims:

Col. 15 Line 66, Col. 16 Line 1, Col. 16 Line 4, Col. 16 Line 10, Col. 16 Line 15, Col. 16 Line 19, Col. 16 Line 25, the word "system" should be changed to --apparatus--.

Signed and Sealed this
Fourteenth Day of October, 2014

Michelle K. Lee
*Deputy Director of the United States Patent and Trademark Office*